United States Patent
Forster

(10) Patent No.: US 8,286,937 B2
(45) Date of Patent: Oct. 16, 2012

(54) TUBULAR VALVE DEVICE

(75) Inventor: Joachim Forster, Winnenden (DE)

(73) Assignee: Karl Dungs GmbH & Co. KG, Urbach (DE)

( * ) Notice: Subject to any disclaimer, the term of this patent is extended or adjusted under 35 U.S.C. 154(b) by 405 days.

(21) Appl. No.: 12/587,736

(22) Filed: Oct. 13, 2009

(65) Prior Publication Data
US 2010/0102259 A1   Apr. 29, 2010

(30) Foreign Application Priority Data
Oct. 15, 2008   (DE) .......................... 10 2008 051 759

(51) Int. Cl.
*F16K 25/00* (2006.01)

(52) U.S. Cl. .............. 251/158; 251/129.16; 251/129.21; 251/172; 251/174; 251/249.5; 137/219; 137/613; 137/628

(58) Field of Classification Search .................. 251/158, 251/129.15, 129.16, 129.21, 172, 174, 249.5, 251/318, 325; 137/219, 613, 614.19, 557, 137/628
See application file for complete search history.

(56) References Cited

U.S. PATENT DOCUMENTS

| | | | | |
|---|---|---|---|---|
| 684,913 A | * | 10/1901 | Cordell | 251/229 |
| 1,147,023 A | * | 7/1915 | Holmquest | 123/190.14 |
| 1,387,446 A | * | 8/1921 | Astier | 137/219 |
| 1,473,634 A | * | 11/1923 | Loudon | 251/77 |
| 2,852,035 A | * | 9/1958 | Holle et al. | 137/219 |
| 2,962,039 A | * | 11/1960 | Shand et al. | 137/219 |
| 3,148,859 A | * | 9/1964 | Sevetz | 251/321 |
| 3,322,138 A | * | 5/1967 | Backman | 137/219 |
| 3,583,426 A | * | 6/1971 | Feres | 137/240 |
| 3,605,878 A | * | 9/1971 | Coleman | 165/272 |
| 3,654,950 A | * | 4/1972 | Hamm | 137/219 |
| 4,077,425 A | * | 3/1978 | Drori | 137/219 |
| 4,605,035 A | * | 8/1986 | Rasmussen et al. | 137/240 |
| 4,662,395 A | * | 5/1987 | Strangfeld | 137/614.19 |
| 5,826,613 A | * | 10/1998 | Schalk | 137/219 |
| 6,047,766 A | * | 4/2000 | Van Brocklin et al. | 165/104.26 |
| 7,004,186 B2 | * | 2/2006 | Ferrel | 137/12 |
| 2004/0045603 A1 | * | 3/2004 | McCarty et al. | 137/219 |
| 2007/0284002 A1 | * | 12/2007 | Hartman et al. | 137/219 |

FOREIGN PATENT DOCUMENTS

| | | |
|---|---|---|
| DE | 100 62 487 | 7/2002 |
| DE | 199 64 256 | 3/2005 |

OTHER PUBLICATIONS

Office Action German Patent Office dated Jun. 8, 2009.

* cited by examiner

*Primary Examiner* — John Rivell
*Assistant Examiner* — Minh Le
(74) *Attorney, Agent, or Firm* — Emch, Schaffer, Schaub & Porcello Co., L.P.A.

(57) ABSTRACT

The presented valve (1) is based on two axially adjustable sleeve-shaped valve seat rings (14, 36) that are associated with locking arrangements in the form of annular armature plates (22, 35) and associate holding coils (24, 36). The valve closure member (39) can be variably adjusted via a position adjustment drive. Said valve closure member has a double function. On the one hand, it acts to move the valve seat rings (14, 26) into locking position and, on the other hand, it acts to control the gas flow.

16 Claims, 2 Drawing Sheets

TUBULAR VALVE DEVICE

BACKGROUND OF THE INVENTION

Figure 1:
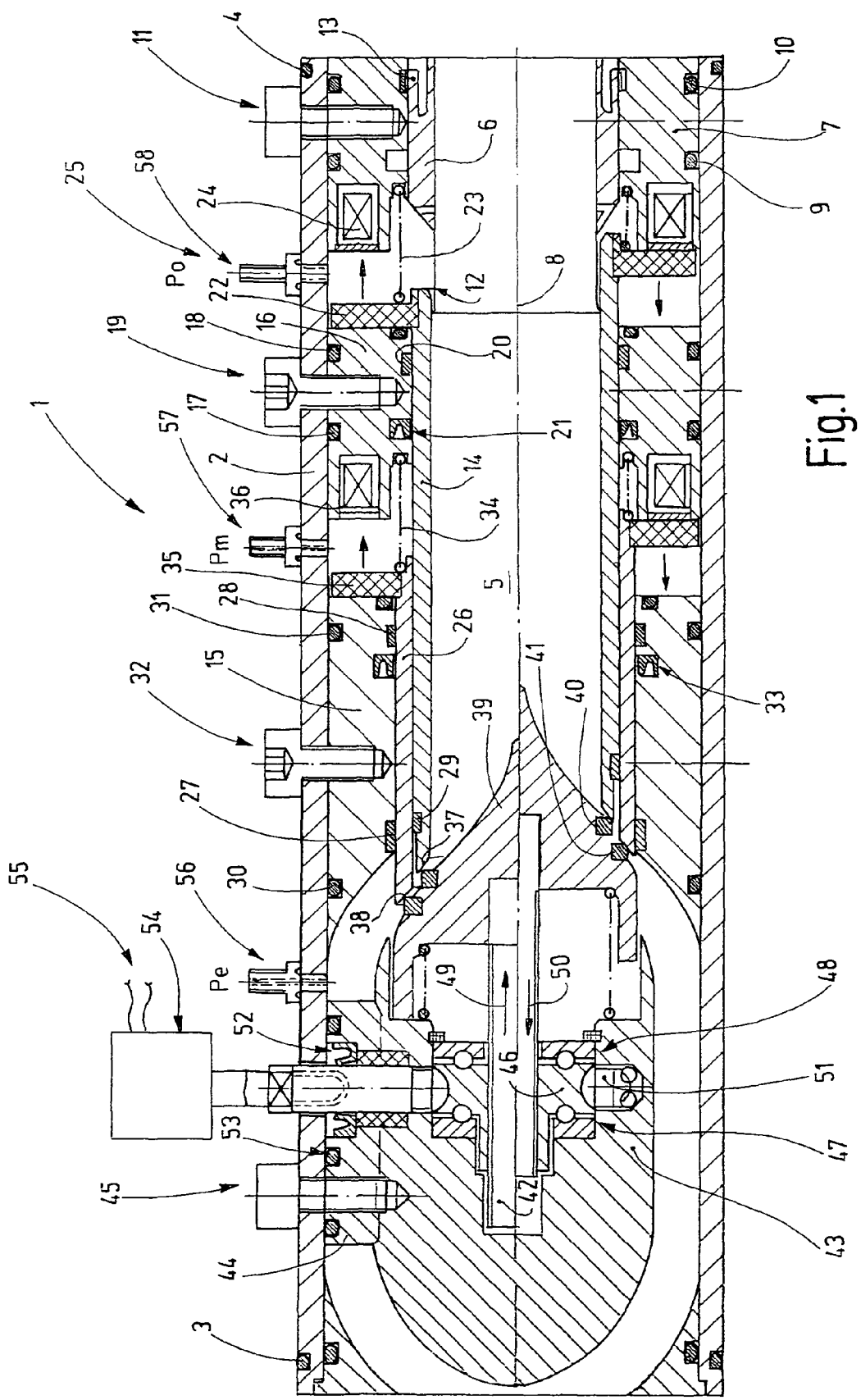

The invention relates to a valve in the form of a pipe as well as to a method for releasing and blocking a fluid stream by means of such a valve.

Basically, valves have a valve housing and, arranged therein, at least one valve closure member. Frequently, the valve closure member can be moved relative to a valve seat in a linear back-and-forth manner in order to close and open the valve seat in a controlled manner. Frequently, to actuate such valves, pull-type electromagnets are used whose armature moves the valve closure member against the force of a return spring away from the valve seat. Such magnets have a self-closing function. When the dimensions of the magnetic drive are established, care is taken that said drive is able to overcome the force of the return spring. Frequently, this results in relatively large and correspondingly power-demanding magnetic drives.

It has also been suggested to adjust the valve closure member via a motor-driven adjustment unit. The linear adjustment movement for the valve closure member is generated by the rotary motion of the motor, for example, via spindle lifting gears.

Considering such valves, it is relatively difficult to achieve a self-closing function that is required when the valve closes automatically in case of danger.

The self-closing function is mostly provided by return springs that, in the first-mentioned case, guide the pull-type electromagnet and, in the second-mentioned case, guide the motor adjustment drive out of the open position into the closed position. The correspondingly heavily dimensioned return springs can result in a shock-like, hard placement of the valve closure member on the valve seat and, in the course of time, cause damage there.

SUMMARY OF THE INVENTION

It is the object of the invention to disclose measures with which at least one of the aforementioned problems can be overcome or at least minimized on a fluid valve.

This object is achieved with a valve of the present invention which comprises a tube-shaped housing in which a sleeve-shaped valve seat ring is arranged so as to be movable in axial direction. Optionally, however preferably, two such valve seat rings arranged concentrically relative to each other are provided. A locking arrangement is disposed to selectively lock the valve seat rings in a prespecified position and to optionally release them. The valve seat rings are associated with at least one valve closure member that is also supported so as to be movable. Said valve closure member is arranged so as to be movable toward the valve seat rings and away from them, in order to selectively close, shift or release the valve seat rings. In order to move the valve closure member, an adjustment arrangement is provided for the adjustment of the position of said adjustment arrangement.

Such a valve permits the shifting of the valve seat rings by means of the adjustment arrangement of the valve closure member. The adjustment arrangement of the valve closure member can be used in a targeted manner to shift the valve seat rings into a locking position in which they can be held in place by the locking arrangement. Once the valve seat rings have been locked in this position, the valve closure member can be moved away from the valve seat rings by actuating the adjustment arrangement in order to permit the gas flow, or the flow of another fluid, in a controlled manner. In so doing, the valve closure member can be used for a fine adjustment of the fluid flow, as well as for simple opening and closing. Preferably, the adjustment arrangement is configured in such a manner that the adjustment speed of the valve closure member, as well as its positioning, can be controlled in a finely adjusted manner. For example, a stepper motor drive may be used for the adjustment of the valve closure member.

In order to effect a rapid closure, only the locking arrangement of at least one of the valve seat rings needs to be released. At the time of release, it is possible to move the valve seat rings by means of a suitable means such as, for example, spring means, e.g., compression springs, tension springs, repelling permanent magnets, attracting permanent magnets or the like, toward the valve closure member in order to close the fluid path. To this extent, the closing function is independent of the actual position of the valve closure member. The rapid closure of the valve is achieved by unlocking at least one valve seat ring and by shifting at least one valve seat ring toward the valve closure member.

Considering the valve described so far, several advantages can be achieved. On the one hand, the locking arrangement can be configured in a particularly simple and power-conserving manner by means of a no-work magnet, said magnet having a pulling force that need not be strong enough for overcoming the return spring. In so doing, the no-work magnet may be provided with a relatively weakly dimensioned hold-on coil. The use of copper is minimal. Heat development and power consumption are correspondingly low.

The return spring acts on the valve seat ring. The applied gas pressure generates only a minimal force acting on the valve seat ring. The effective surface that is affected by the gas pressure is merely the face of the valve seat ring. This prevents shock-like closure operations, on account of which the fluid medium flowing through the valve causes the valve closure member and the valve seat to impact hard against each other due to static pressure or due to additionally occurring dynamic pressure. This reduces wear on the valve seat and on the valve closure member.

In addition, the concept in accordance with the invention permits, without problems, the combination of the fine adjustment function of a valve comprising a valve closure member that can be finely positioned with the rapid closure function of an open/close valve. This is achieved in that the rapid closure function is associated with the valve seat ring, whereas the fine adjustment function is associated with the valve closure member.

Closing of the valve can be accomplished by releasing the locking arrangement or also by maintaining the lock by correspondingly controlled holding in place the valve closure member. In the latter case, the release of the locking arrangement is used exclusively for safety the shut-off.

The aforementioned advantages can also be achieved with the valve having a single valve seat ring and a locking device in the valve configured as a magnetic coil or, if required, also in another manner, said magnetic coil being arranged inside or outside the tubular housing. The arrangement of the magnetic coil locks at least one valve seat ring in the housing. The magnetic coil may be cooled by the fluid stream flowing through the housing. This measure allows higher current densities in the magnetic coil and thus save copper.

Under another embodiment, an adjustment arrangement for the valve closure member may, in principle, be configured in any desired way, including an arrangement with a self-holding function. For example, a self-locking transmission is provided between a drive, for example a motor, and the valve closure member. Such a transmission may be a spindle lifting gear, a worm gear or the like, or a combination of several such gears.

The drive for the adjustment arrangement is preferably an electric motor. It may be configured as a stepper motor, direct-current motor, synchronous motor, asynchronous motor or the like. Said motor may be arranged inside the tubular housing as well as outside said housing.

The valve in accordance with the invention permits the use of particularly energy-saving drives. In addition, this results in a high volume flow with a small nominal width and an overall small construction volume. On its ends, the tubular housing may be provided with threads, flanges or other connecting means. In addition, at least when the valve closure member is associated with two valve seat rings, a tightness check can be performed. This applies, in particular, when the two valve seat rings are sealed relative to each other in order to define a central space included between the valve seat rings, to which central space a pressure monitor can be attached. Furthermore, it has been found that the valve concept results in valves that can function independently of their built-in position. Furthermore, the concept is suitable for a pressure range between 0 and several bar and thus for many applications for many different customers. The valve can be actuated quietly. Opening and closing noise is minimized. As mentioned, the fluid flow can be continuously modulated. Furthermore, said concept is based on few components and can be easily adapted to various situations of use.

Additional details of advantageous embodiments of the invention result from the description or the drawings. The description is restricted to essential aspects of the invention and other situations. The drawings disclose additional details of the exemplary embodiment and are to be referred to as a supplement.

IN THE DRAWINGS

Figure 2:
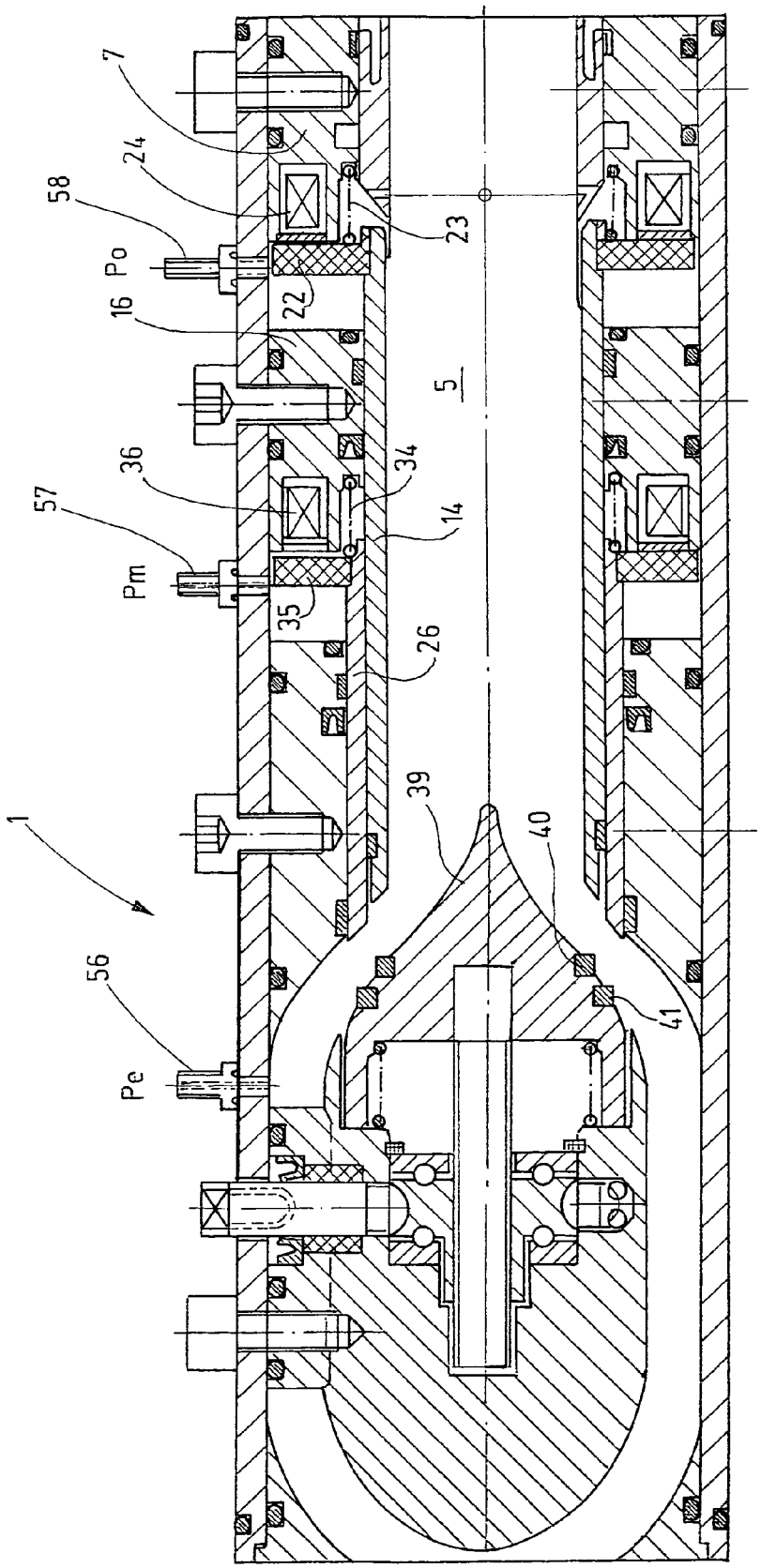

FIG. 1 a simplified illustration, in longitudinal section, of a valve in accordance with the invention in a first closing position in the upper half of the figure and in a second closing position in the lower half of the figure; and FIG. 2 an illustration, in longitudinal section, of the valve in accordance with FIG. 1 in open position.

DETAILED DESCRIPTION OF THE INVENTION

FIG. 1 shows a valve 1 that has a tubular housing 2, for example, a gas valve that is disposed to act as a gas safety valve, for example. On its two ends that face away from each other, the housing 2 is provided with not specifically illustrated connecting means for the connection of additional pipes and, for example, seals 3, 4. Inside the housing 2, a fluid channel 5 is defined, said channel leading from one end to the other end. On its input side, the fluid channel 5 is delimited by a tubular guide piece 6 that is stationarily held by a ring 7 in the housing and is concentric to a center axis 8. The ring 7 has on its preferably cylindrical outside circumference at least one or also more circumferential grooves in which seals 9, 10 may be placed in order to seal the ring 7 in axial direction against the inside wall of the tubular housing 2. A screw 11 may be provided to secure the ring 7 in place.

The insert 6 has a tubular lip 12 that extends away from the open end of the insert 6 into the interior space of the housing 2. In addition, the insert 6 is provided with a fastening arrangement, for example, in the form of detent fingers 13 that cause the insert 6 to be axially secured on the ring 7 and, for example, come into engagement with a groove.

Adjoining the insert 6 is the fluid channel that is delimited by an elongated, tubular valve seat ring 14. Said valve seat ring can be slid in axial direction and is configured as a sleeve. It is centered by two axially spaced-apart guide rings 15, 16 in the tubular housing 2 relative to the center line 8.

The cuff 12 of the guide insert 6 extends into the interior space of the valve seat ring 14 and abuts against the wall of said ring in a sliding manner when the valve seat ring 14 is shifted in axial direction. By means of the seals 17, 18 that are concentric to the center line 8, the guide ring 16 s sealed with respect to the inside wall of the housing 2, and is non-torsionally and axially firmly secured by a screw 19. On its inside, it has a sliding ring 20 that allows easy shifting of the valve seat ring 14. In addition, it is provided with a seal, for example in the form of a lip seal 21, that seals the guide ring 16 against the valve seat ring 14, outward in axial direction so as to be gas-tight.

The end of the valve seat ring 14 facing the guide piece 6 is provided with a soft magnetic armature ring 22. The latter can be axially moved, together with the valve seat ring 14. A compression spring 23 biases the valve seat ring 14 and, in so doing, the armature ring 22 projected away from the ring 7.

The ring 7 consists, for example, of a soft magnetic material. In particular, said ring may be provided with a groove on its side facing the armature ring 22, said groove accommodating a coil 24. The convolutions of the coil 24 are preferably concentric to the center line 8.

Together with the coil 24, the armature ring 22 forms a locking arrangement 25, by means of which the valve seat ring 14 can be held in a position in which the armature plate 22 abuts against the ring 7. This position is shown in FIG. 1, bottom; whereas FIG. 1, top, shows the position that is adopted by the valve seat ring 14 when the coil 24 is currentless.

At least considering a preferred embodiment, a second valve seat ring 26 is provided concentric to the first valve seat ring 14, said second valve seat ring being arranged concentric to the first valve seat ring 14 and circumscribing its outside surface. The valve seat ring 26 is configured as a sleeve and is seated in the guide ring 15 that comprises one or more sliding rings 27, 28. The latter permit an easy axial shifting of the valve seat rings 26 against the guide ring 15, as well as against the inner valve seat ring 14. Between the valve seat rings 14, 26, it is possible to arrange an additional sliding ring 29 that is connected, for example, with the valve seat ring 14 or, alternatively, with the valve seat ring 26.

By means of seals 30, 31, the guide ring 15 is sealed and stationarily secured in the housing 2 by at least one screw 32. Said guide ring has an inner annular groove on which a lip seal 33 is seated. Said lip seal seals the second valve seat ring 26 in a gas-tight manner on the outside.

The second tubular valve seat ring 26 can be axially moved against the force of a compression spring 34. One end of the compression spring 34 abuts against the guide ring 16 and the other end against the valve seat ring 26. On the same end, the latter is connected to a disk-shaped armature ring 35 that can be moved, together with the valve seat ring 26, against the force of the compression spring 34 toward the guide ring 16. On its side facing the armature ring 35, the guide ring 16 has an annular groove in which a coil 36 is seated. The convolutions of this coil 36 are oriented so as to be concentric to the center line 18. The guide ring 16 may consist of soft magnetic material. The armature ring 35 and the coil 36, as well as the guide ring 16, are dimensioned in such a manner that the coil 36—when current is applied—can hold the armature ring 35 on the guide ring 16. This position is shown in FIG. 1, bottom. FIG. 1, top, shows the position of the valve seat ring 26 and the armature ring 35 in currentless mode of the coil 36. Together with the armature ring, the coil 36 forms a locking arrangement for the second valve seat ring 26.

Both valve seat rings 14, 26 have sealing surfaces 37, 38 on their ends facing away from the respective armature rings 22, 35, said sealing surfaces being configured, for example, as conical annular surfaces. These sealing surfaces 37, 38 represent the actual valve seat. They are associated with a valve closure member 39 that, as illustrated, may be configured as a flow body. The tip of said flow body is preferably located approximately on the center line 8. Starting there, the valve closure member 39 is conical, drop-shaped or configured in another flow-enhancing manner. In the present exemplary embodiment, it comprises two annular seals 40, 41 that are arranged concentric to the center line 8. Their diameter has a size such that they come into abutment with the sealing surfaces 37, 38. For example, they have a rectangular cross-section and are partially seated in the valve closure member 39.

The valve closure member 39 is arranged so as to be axially adjustable along the center line 8. This is accomplished with any suitable adjustment drive. The valve closure member 39 is shown in FIG. 1, top, in its left-side extreme position, in which it displays the greatest possible distance from the guide ring 15. FIG. 1, bottom shows its right-side extreme position, in which it displays the closest possible approach to the guide ring 15. As is obvious, the maximum stroke of the valve closure member 39 is at least as large as the maximum stroke of the two valve seat rings 14, 26.

On its rear side, facing away from its tip, the valve closure member 39 has the shape of a cup and is provided with a threaded spindle 42. The latter immerses into the bore of a guide body 43 that is held at a distance from the interior wall of the housing so as to be centric to the center line 8. In order to eliminate play, a compression spring may be provided, said spring pushing the valve closure member 39 in closing direction. The guide body 43 has at least one, preferably several, for example three, guide extensions 44 that extend from said body like spokes and abut on the inside against the interior surface of the housing. A threaded bore provided in such a radial extension 44 can be used for the accommodation of a fastening screw 45, said screw being disposed to axially and stationarily secure the guide body 43. The guide body 43 has an interior space in which a threaded nut 46 is rotatably supported between two axial thrust bearings 47, 48. The threaded nut 46 thus effects an adjustment of the threaded spindle 42 and thus of the valve closure member 39 in the direction of the arrow 49 or 50.

On its outside, the threaded nut 46 is provided with teeth. These mesh with a worm 51 that is arranged so as to be tangential with respect to the gear formed by the threaded nut 46, and is rotatably supported. The worm 51 extends through the guide body 43 and the radial extension 44. Said worm projects toward the outside through an opening in the housing 2. A lip seal 52 or another sealing means provided in the radial extension 44 seals the gas chamber toward the outside. An additional sealing means, for example an 8-shaped rubber seal 53 that is arranged in an appropriately formed groove of the radial extension 44 additionally seals the threaded bore of the fastening screw 45, as well as the passage bore for the worm 51 toward the outside.

The end of the worm 51 that projects toward the outside can be connected with a rotary drive such as, for example, a stepper motor or another motor 54. Its electrical connections 55 are only symbolically shown in FIG. 1. Via a not specifically illustrated holder, the motor 54 is connected to the housing 2.

Optionally, the pressure measuring connections 56, 58—individually or in connection with each other—may be provided on the housing 2. The pressure connection 56 measures the pressure on the outflow side. The pressure connection 58 allows the measurement of the pressure on the inflow side. The pressure connection 57 allows the measurement of the pressure between the two valve seat rings 14, 26. Considering the described valve 1, this is a double seat valve. The connection 57 leads to the so-called center space between the two individual valves. The first valve is formed by the valve seat ring 14 and the annular seal 40. The second valve is formed by the valve seat ring 26 and the annular seal 41.

The valve 1 that has been described so far operates as follows:

First, it will be assumed that the valve 1 is currentless. Neither the coil 24 nor the coil 36 conducts current. The valve seat rings 14, 26 are shifted by the associate compression springs 23, 34, respectively, as far as possible in the direction toward the valve closure member 39. The sealing surfaces 37, 38 abut against the annular seals 40, 41. In so doing, the gas flow through the fluid channel 5 is stopped independently of the position of the valve closure member 39. If said valve closure member is in a left position, as is illustrated by FIG. 1, top, the valve is closed in the same way as it is when it is in a right position, as is shown by FIG. 1, bottom.

If the valve 1 is to be opened, the valve closure member 39 is moved by the appropriate actuation of the motor 54 so that the valve seat rings 14, 26 are shifted toward the coils 24, 36, unless said valve has already taken this position. To do so, the threaded nut 46 is rotated in such a direction that the threaded spindle 42 moves in the direction of the arrow 49. As a result of this, the valve closure member 39 shifts the valve seat rings 14, 26 out of the upper position in FIG. 1 into the lower position in FIG. 1, where the armature rings 22, 35 abut against the ring 7 or the guide ring 16. When current is applied to the coils 24, 36, the armature rings 22, 35 adhere to the rings 7, 16. The compression springs 23, 34 have a strength such that they cannot overcome this force of adhesion. Consequently, the valve seat rings 14, 26 are locked in a position in which the valve can be opened by adjusting the valve closure member 39.

When the valve closure member 39 is in the position as illustrated in FIG. 1, bottom, the valve 1 is in rest position. Opening is instantly possible out of this position, in that current is applied to the coils 24, 26 and the motor 54, so that the motor 54 moves the threaded spindle 42 in the direction of the arrow 50. As a result of this, the valve 1 moves into the mode shown in FIG. 2. The valve closure member 39 releases the valve seats while the coils 24, 36 hold the valve seat rings 14, 26 in the release position in accordance with FIG. 2, namely, as a result of the electrical current flow. The valve closure member 39 can now be adjusted in any manner in order to completely open, or more or less throttle, the gas flow through the fluid channel 5. However, said gas flow may also again be set to zero when the valve closure member 39 is moved into closing position.

If the valve 1 is open in the position in accordance with FIG. 2 and is then to be closed quickly, it is sufficient to interrupt the supply of power to at least one of the coils 24, 36. In this case the adhering force holding the armature rings 22, 35 against the coils 24, 36 is discontinued. The compression springs 23, 34 now push the armature rings 22, 35 away from the faces of the rings 7, 16, as a result of which the valve closure rings 14, 26 having the sealing surfaces 37, 38 move against the sealing rings 40, 41 and create a seal there, irrespective of the position of the valve closure member 39.

The valve 1 that has been described so far thus fulfills—with a low energy demand and a small design—a safety function with fast closure characteristics as well as a modulation function. In addition, a tightness check can be performed in that the pressure in the center space is monitored via the connection 57. In so doing, it is also possible to close only one valve of this double valve arrangement. This may be accomplished, for example, in that both valve seat rings 14, 26 are moved into locking position in accordance with FIG. 2 and held there, whereupon the valve closure member 39 moves into open position, and the lock is released for only one of the two valve seat rings 14, 26, or the locks of the two valve seat rings 14, 26 are released in sequence. If, for example the lock of the valve seat ring 14 is to be released first and thereafter the lock of the valve seat ring 26, the pressure at the connection 57 must correspond to the pressure at the connection 56. If the pressure increases with time, the valve of the valve seat ring 14 is not tight. Conversely, the pressure at the connection 57 must correspond to the pressure at the connection 58 when first the coil 36 and then the coil 24 become currentless. The gas volume enclosed in the center space displays the input pressure. If said pressure drops gradually, the valve of the valve seat ring 26 is not tight.

The presented valve 1 is based on two axially adjustable sleeve-shaped valve seat rings 14, 26 that are associated with locking arrangements in the form of annular armature plates 22, 35 and associate holding coils 24, 36. The valve closure member 39 can be variably adjusted via a position adjustment drive. Said valve closure member has a double function. On the one hand, it acts to move the valve seat rings 14, 26 into locking position and, on the other hand, it acts to control the gas flow.

The invention claimed is:

1. A valve (1) comprising a tubular housing (2) extending along an axis;
   a first valve seat ring (14) extending along said axis in said housing and movable in axial direction;
   a second valve seat ring (26) encircling said first valve seat ring and movable in axial direction;
   a valve closure member (39) axially movable toward and away from the valve seat rings (14, 26) to close and open said valve seat rings (14, 26);
   means for adjusting the axial position of the valve closure member (39) in said housing; and
   a locking arrangement (22, 24, 35, 36) associated with the valve seat rings (14, 26) in order to selectively lock said valve seat rings in a prespecified position.

2. A valve in accordance with claim 1 wherein said means for adjusting the axial position of said valve closure member (39) includes a threaded spindle (42) secured to said valve closure member (39), a nut (46) threadedly engaged to said spindle and means for rotating said threaded nut.

3. A valve in accordance with claim 2 wherein said means for rotating said threaded nut comprises a worm gear engaged to teeth on said threaded nut and means for rotating said worm gear.

4. A valve in accordance with claim 3 wherein said worm gear extends outwardly of said housing and is connected to power means (54) outside the housing (2).

5. A valve in accordance with claim 1, characterized in that the locking arrangement (22, 24, 35, 36) comprises a magnetic coil (24), said coil being arranged in the tubular housing (2).

6. A valve in accordance with claim 1, characterized in that the valve seat ring (14) is associated with a biasing means (23) urging the valve seat ring (14) in the direction toward the valve closure member (39).

7. A valve in accordance with claim 1, characterized in that the valve closure member (39) is configured as a flow body.

8. A valve (1) comprising
   a tubular housing (2);
   a valve closure member (39) in said housing;
   a first valve seat ring (14) in said housing and movable in axial direction into and out of engagement with said valve closure member (39);
   a magnetic coil (24) in said housing for controlling movement of said valve seat ring (14) in one or more prespecified positions; and
   a second valve seat ring (26) arranged so as to be axially movable and concentrically arranged with respect to the first valve seat ring (14), whereby each valve seat ring (14, 26) is associated with one compression spring (23, 24), respectively, in order to bias the valve seat rings (14, 26) in the direction toward the valve closure member (39).

9. A valve in accordance with claim 8, characterized in that the valve seat rings (14, 26) are sealed relative to each other and delimit a center space where at least one pressure pick-off is provided (57).

10. A valve in accordance with claim 8, characterized in that the stroke of the valve seat rings (14, 26) corresponds at least to the extent of the stroke of the valve closure member (39).

11. A valve in accordance with claim 8, characterized in that a locking arrangement is provided to selectively lock said valve seat rings in a prespecified position.

12. A valve (1) comprising
   a tubular housing (2);
   a valve closure member (39) in said housing;
   a first valve seat ring (14) in said housing and movable in axial direction into and out of engagement with said valve closure member (39);
   a magnetic coil (24) in said housing for controlling movement of said valve seat ring (14) in one or more prespecified positions; and
   means for adjusting the axial position of said valve closure member (39) said adjusting means including a threaded spindle (42) secured to said valve closure member (39) a nut (46) threadedly engaged to said spindle and means for rotating said threaded nut.

13. A valve in accordance with claim 12 wherein said means for rotating said threaded nut comprises a worm gear engaged to teeth on said threaded nut and means for rotating said worm gear.

14. A valve in accordance with claim 13 wherein said worm gear extends outwardly of said housing and is connected to power means (54) outside the housing (2).

15. A valve in accordance with claim 11, characterized in that the locking arrangement (22, 24, 35, 36) comprises a magnetic coil (24), said coil being arranged in the tubular housing (2).

16. A method for releasing and blocking a fluid flow by means of a valve (1) having a housing (2) extending along an axis, a valve closure member (39) and a valve seat ring (14) in said housing, comprising the steps of
   providing a spring (23);
   urging said valve seat ring (14), under the effect of said spring (23), into sealing engagement with the valve closure member (39),
   moving the valve closure member (39) in a first direction (49) in order to shift the valve seat ring (14) against the force of said spring (23) until the valve seat ring (14) reaches a predetermined position engaging an armature ring (22) to said valve seat ring;

providing a back-up ring (7) for limiting the axial movement of said armature ring (22);

applying a current to said armature ring (22) when it is engaged to said back-up ring (7) to cause said armature ring (22) to adhere to said back-up ring (7) with a force great enough to prevent said spring (23) from disengaging said armature ring (22) from said back-up ring (7) in order to hold the valve seat ring (14) in a locked position; and adjusting the valve closure member (39) by moving it in a second direction (50), said second direction being opposite the first direction (49), away from the locked valve seat ring (14).

* * * * *